United States Patent
Thomke (10) Patent No.: US 10,849,720 B2
(45) Date of Patent: Dec. 1, 2020

(54) DENTAL IMPLANT AND DENTAL IMPLANT SYSTEM

(71) Applicant: Woodwelding AG, Stansstad (CH)

(72) Inventor: Ernst Thomke, Grenchen (CH)

(73) Assignee: WOODWELDING AG, Stansstad (CH)

( * ) Notice: Subject to any disclaimer, the term of this patent is extended or adjusted under 35 U.S.C. 154(b) by 371 days.

(21) Appl. No.: 15/662,585

(22) Filed: Jul. 28, 2017

(65) Prior Publication Data

US 2018/0028284 A1     Feb. 1, 2018

(30) Foreign Application Priority Data

Jul. 29, 2016 (CH) ........................... 1001/16

(51) Int. Cl.
*A61C 8/00*     (2006.01)

(52) U.S. Cl.
CPC .......... *A61C 8/0036* (2013.01); *A61C 8/0012* (2013.01); *A61C 8/0016* (2013.01); *A61C 8/0018* (2013.01); *A61C 8/0043* (2013.01); *A61C 2008/0046* (2013.01)

(58) Field of Classification Search
CPC .... A61C 8/16; A61C 8/36; A61C 8/43; A61C 8/00; A61B 17/17; A61B 17/8625; A61B 17/8866
USPC .................................................. 433/172–175
See application file for complete search history.

(56) References Cited

U.S. PATENT DOCUMENTS

| 5,246,370 A * | 9/1993 | Coatoam ................... A61C 8/00 433/173 |
| 8,911,234 B2 * | 12/2014 | Mayer ..................... A61B 17/68 433/173 |
| 2004/0030341 A1 * | 2/2004 | Aeschlimann ... A61B 17/00491 606/232 |
| 2004/0053196 A1 * | 3/2004 | Mayer ..................... A61B 17/68 433/173 |
| 2005/0059972 A1 * | 3/2005 | Biscup ................. A61B 17/686 606/308 |
| 2006/0105295 A1 * | 5/2006 | Mayer ..................... A61B 17/68 433/173 |

(Continued)

FOREIGN PATENT DOCUMENTS

| WO | 02/069817 | 9/2002 |
| WO | 2004/017857 | 3/2004 |

(Continued)

*Primary Examiner* — Edward Moran
*Assistant Examiner* — Matthew P Saunders
(74) *Attorney, Agent, or Firm* — Rankin, Hill & Clark LLP (57) ABSTRACT

A dental implant includes an implant body with a coronally open cavity as well as at least one exit opening from an inside to the enossal outer surface. A thermoplastic element in the solid condition is arranged in the cavity or is introducible into the cavity and can be brought into an at least partly flowable condition by way of applying a pressing force, which is directed apically into the cavity, and mechanical oscillations and in this condition at least a share of the flowable material of the thermoplastic element can be pressed through the at least one exit opening into surrounding bone tissue on account of the pressing force, when the implant body is arranged in an opening in the bone tissue and the enossal outer surface is in contact with the bone tissue.

19 Claims, 7 Drawing Sheets (56) References Cited

U.S. PATENT DOCUMENTS

| | | | | |
|---|---|---|---|---|
| 2007/0264612 A1* | 11/2007 | Mount | ..................... | A61C 8/00 |
| | | | | 433/173 |
| 2009/0317768 A1* | 12/2009 | Mayer | ..................... | A61B 17/68 |
| | | | | 433/201.1 |
| 2012/0221062 A1* | 8/2012 | Wenger | .................. | A61B 17/68 |
| | | | | 606/304 |
| 2016/0270887 A1* | 9/2016 | Pearson | ............... | A61C 8/0036 |

FOREIGN PATENT DOCUMENTS

| | | |
|---|---|---|
| WO | 2005/079696 | 9/2005 |
| WO | 2007/101362 | 9/2007 |
| WO | 2011/054122 | 5/2011 |
| WO | 2013/124260 | 8/2013 |

\* cited by examiner

DENTAL IMPLANT AND DENTAL IMPLANT SYSTEM

BACKGROUND OF THE INVENTION

Field of the Invention

The invention lies in the field of dental implant systems.

Description of Related Art

So-called single-part and so-called two-part implant systems are known amongst dental implant systems.

In single-part dental implant systems, the actual dental implant—which is implanted into the jawbone and serves for anchoring a functional superstructure, for example a crown, a bridge or a prosthesis—has a structure that is accessible from coronally after the implantation and on which the attachment part can be fastened in a direct manner.

In two-part dental implants, apart from the actual implant (also called "anchoring part" or "screw" if it is provided with a thread), an abutment, which is envisaged for fastening to this actual implant, is necessary. Here, the anchoring part can be designed such that it is introduced in a manner in which it is approximately flush with the bone surface (as a so-called bone-level implant) or, coronally of the bone surface it can be provided with a region that is often widened with respect to the enossal region which is generally provided with a thread, the first-mentioned region sometimes being termed a "tulip" and being envisaged to reach roughly up to the gum surface. Implants with such a transgingival region are called tissue-level implants. In two-part implant systems, the region ("post") that projects out of the gums and which serves for fastening a superstructure, thus a crown, bridge, prosthesis or the like is formed by the abutment.

The implants that are to be screwed into the bone have gained a high popularity in the case of single-part implant systems as well as two-part implant systems. A relatively controlled implantation is possible by way of such implants, and the outer thread of the implant creates at least some degree of primary stability.

Despite this certain degree of primary stability, the implantation process is very cumbersome and protracted. Firstly, after the extraction of the tooth that no longer fulfils its function, one must wait for a relatively long time until the bone has regenerated again at the location of the extraction to such an extent that it is sufficiently stable for an implant which is to be subsequently implanted. A hole is subsequently drilled at the location of implantation, and the implant is introduced. A multi-month healing-in phase, during which the implant is not mechanically loadable is subsequent to this. Concerning sub-gingival (bone level) implants, the gums are closed above the implant during this healing-in phase, whereas a suitable protection must be attached in the case of other implants. Only after the healing-in phase is the final provision with an abutment and crown, bridge or prosthesis effected, possibly after a renewed opening of the gums.

It has also been suggested, for example in WO 2013/124260, to have a dental implant mass-produced in a shape that is adapted to the extracted tooth and to insert it directly into the extraction alveolus (extraction socket) after the extraction of the tooth. With this approach, there is no waiting time for the post-growing of the bone. However, on account of the non-round cross section, the dental implant can only be implanted by way of knocking in, which is why only a very small primary stability is possible after the implantation. For this reason, in WO 2103/124260 it is suggested, after implantation, to fasten the implant on an adjacent tooth by way of a device that is specially envisaged for this. Despite this, after the healing-in, a further treatment step is necessary, by way of the fastening having to be removed and the final crown only then being able to be placed. Neither does the procedure according to WO 2013/124260 solve the problem of a longer bone regeneration phase being necessary between the treatment steps.

Amongst other things, a dental implant which consists of a thermoplastic or thixotropic material is known from WO 02/069 817. For anchoring, this material is pressed apically into the jawbone in a linear movement amid ultrasonic vibrations, by which means it is pressed in the flowable condition into the pores of the bone and is anchored there. Towards the coronal side, it has a structure, into which an artificial tooth can be screwed. With such a system, the orientation of the implant after implantation must be defined if the artificial tooth is shaped in an anatomically meaningful manner. WO 2004/017857 also teaches implants, amongst these dental implants, concerning which an anchoring in the bone is accomplished by way of liquefaction of thermoplastic or thixotropic material and the subsequent solidification in a condition, in which the bone tissue is interpenetrated. According to WO 2004/017857, additionally to thermoplastic or thixotropic material, the implant includes a part that forms a surface region of a non-liquefiable material, the region remaining free of liquefied material even after implantation. Similarly, WO 2005/079696 also teaches such implants, which, however, are characterised in that bone tissue is removed apically by way of the linear movement on introduction, by way of the implant including cutting edges in order create a cavity in the first place, into which cavity the implantation is effected. WO 2005/079696 also teaches embodiments, in which thermoplastic or thixotropic material is brought into a cavity and after liquefaction penetrates from this cavity through exit openings into the surrounding tissue. WO 2005/079696 teaches sealingly closing this cavity after implantation. Finally, according to WO 2011/054122, surgical implants are anchored by way of thermoplastic material, which, in a flowable condition, is pressed into the bone, wherein the surgical implant forms a sleeve with a longitudinal opening, into which a thermoplastic element is inserted and against whose distal end the element is pushed for the liquefaction.

The anchoring of the dental implants according to WO 02/069 817, WO 2004/017857 and WO 2005/079696 is advantageous since the dental implants are anchored in a stable manner directly after the implantation and the anchoring is immediately loadable, which in comparison entails significant advantages for the patient. However, the use of these implants also generally entails a longer bone regeneration time at least before the implantation. WO 2005/079696 describes approaches with a view to solving these problems, but such approaches are not suitable to the same extent for all implantation situations and moreover entail the naturally compacted bone tissue around the extraction alveolus being removed.

SUMMARY OF THE INVENTION

It is an object of the invention to provide a dental implant and a dental implant system, which overcome the disadvantages of the state of the art and which, in particular, permit an implantation with an immediate primary stability and/or a high anchoring stability without having to accept the disadvantages of the related state of the art.

According to a first aspect of the invention, a dental implant is provided, the implant including:

An implant body that extends between a coronal and an apical end and which defines an enossal outer surface, wherein the implant body includes a coronally open cavity as well as at least one exit opening from an inside to the enossal outer surface, and a thermoplastic element in the solid condition, the thermoplastic element being arranged in the cavity or being introducible into this, wherein the thermoplastic element can be brought into an at least partly flowable condition by way of applying a pressing force which is directed apically into the cavity and mechanical oscillations (for example at frequencies between 10 and 100 kHz) and in this condition at least a share of the flowable material of the thermoplastic element can be pressed through the at least one exit opening into surrounding bone tissue on account of the pressing force, when the implant body is arranged in an opening in the bone tissue and the enossal outer surface is in contact with the bone tissue. The re-solidification (after renewed solidification) of the thermoplastic material after the stoppage of the vibrations effects an anchoring by way of an effected connection between interpenetrated tissue on the one hand and the implant body on the other hand via the thermoplastic material which penetrates both.

According to the first aspect of the invention, the implant is optimised with regard to the anatomical implantation situation and/or is designed for the immediate implantation in the extraction alveolus. For this purpose, it has for example a non-round shape, i.e. it is not rotationally symmetrical about the coronal-apical axis. Additionally or as an alternative, it includes one or more of the following features:

A. In the enossal region (sub-region), an outer surface of the implant body includes a shape which is adapted to the anatomy of a natural tooth, by way of the—in particular non-round—cross section reducing apically in a continuous and stepless manner.

B. The cavity is not rotationally cylindrical, but for example in its shape is adapted to the shape of the natural tooth. The thermoplastic element and/or the distal end of a sonotrode, with which the pressing force and the mechanical oscillations are coupled in, in cross section is/are, for example, not circular but has/have a cross section that corresponds to the shape of the cavity.

C. The implant body in the enossal region includes several root projections (root canals), which are designed as apically projecting projections. In particular, at least one exit opening can run out in each root projection. For this purpose and according to a first option, the implant can include several cavities, one for each root projection, or according to a second option the cavity can branch apically into sub-cavities (part-cavity/canals) which lead into the root projections.

D. A cutting edge, in particular a plough-like cutting edge is present apically of each exit opening.

E. As a constituent of a multi-part implant system, the implant forms a step at the gingiva level or bone level or forms a single-part implant system with a crown, wherein the cavity or the cavities in a manner departing from the crown run apically and is/are closable.

The features can be realised on their own or are arbitrarily combinable, wherein given a combination of the features A and D, feature A is only to be understood for the region coronally of the cutting edge (in other embodiments the steplessness applies to the complete enossal region). All other combinations are possible without limitation, wherein synergy effects can result as is yet described hereinafter.

Thus altogether, apart from the realisation of one of the features on its own, all combinations are also possible, therefore AB, ABC, ABCD, ABCDE, ABCE, ABD, ABDE, ABE, AC, ACD, ACE, ACDE, AD, ADE, AE, BC, BCD, BCE, BCDE, BD, BDE, BE, CD, CE, CDE, DE (all permutations).

In particular, the exit openings are relatively far apically and, inasmuch as several are present, are arranged on a same level. The latter means that there are not several levels of exit openings, i.e. that several exit openings are not arranged above one another at a position which corresponds to one another in the peripheral direction.

The approach according to the mentioned aspect of the invention renders it possible for the implant to be inserted into the extraction alveolus directly after implantation and to be anchored there, and specifically permanently on account of the thermoplastic material (if the material is not resorbable) or at least until the osseointegration has advanced sufficiently far, in order to anchor the implant by way of ingrowth (if the material is resorbable). A disadvantage of those implants, which are adapted in their shape to the extraction alveolus and are anchored into this by way of knocking in, is overcome by way of this. Specifically, it has been found that although an anchoring in the bone via a press fit is capable of being quite stable directly subsequent to implantation, the connection via the press fit however becomes weaker in the following weeks.

The approach of the invention does not rule out the implantologist not placing the implant until after the bone regeneration phase, thus not implanting it directly into the extraction alveolus. Even then, the approach according to the invention is still advantageous and an implant shape that is much better adapted to the anatomy can be selected due to the shape, which does not necessarily have to be rotationally symmetrical and cylindrical or conical, and the long-term stability is therefore significantly encouraged.

The implant body can also be slightly over-dimensioned according to the procedure according to the invention, i.e. the external dimensions are slightly larger than the dimensions of the cavity (extraction alveolus or the opening in the bone, which is created at a later stage), so that on introduction (then for example by way of knocking in) into the cavity, the implant body is pressed into this and also held by a press fit.

A cross-sectional shape which reduces apically in a stepless manner according to feature A imitates the anatomic shape of the root and therefore permits an optimal adaptation to the anatomical conditions. In particular, the shape can be such that the line of the centre of gravity (axial course of the centre of gravity of the horizontal section surface) is arcuate, however for example without the outer surface of the implant forming an undercut in the enossal region.

The implant body of an implant with feature A in particular can have a surface shape that is continuous in the enossal region and which is without ribs or channels, with the exception of an optional surface roughness, which is over the whole surface or is selectively present and which encourages osseointegration. However, the presence of axially, i.e. longitudinally running ribs and/or channels is also not ruled out. An additional retention can therefore be effected by way of the compression of the outer edges that are formed by the ribs given implant materials (for example metallic implant materials) which tend to be softer. In the case of harder implant materials, the bone tissue will yield at the location of the ribs, and the arising structure will contribute to an additional mechanical anchoring.

Very generally, the outer implant surface all in all can be rough in the enossal region, wherein a roughness can be present over the whole surface or selectively only at some locations. As is known per se, the surface roughness can be produced by a material-removing method (sand blasting, laser ablation) and/or a deposition method (coating). The osseointegration can also be encouraged by the selection of matching chemical characteristics of the surface (coating).

A cross-sectional shape according to feature B can be elliptical, approximately polygonal (for example with rounded corners), multi-lobed, etc. In the case of an implant with a non-round cross section, such a cross-sectional shape firstly permits the thermoplastic material to predominantly lie closer to the provided exit opening, and specifically already in the initial condition before the liquefaction.

The feature moreover permits an optimal design/fashioning of the wall thicknesses of the implant body even given comparatively large ratios between the volume of the cavity and the outer cross section of the implant body, which is inherently limited by the anatomy.

The cross-sectional shape of the thermoplastic element can be matched in particular to the cross-sectional shape of the cavity, by way of the thermoplastic element in the solid condition essentially completely filling the cavity in an axial region when it is inserted into the cavity or fills this out from the very onset. Supplementarily or alternatively, a distal end of the sonotrode, with which the liquefaction is effected can have an adapted cross section. By way of this, a back-flow of thermoplastic material coronally can also be prevented when, during the method, the thermoplastic element is liquefied up to the coronal end.

Feature C is firstly based on the recognition that an anatomically optimally adapted implant can also be provided for the replacement of teeth with multi-canal roots. It is therefore not necessary, as is envisaged in the state of the art, to implant an implant with a cross section, which, in the region of the middle of the dental root is accordingly slightly enlarged in comparison to a single root canal, this not being adapted to the natural anatomical conditions, but the implant can be designed almost as the naturally grown one, particularly as the natural dental root shape also at the most forms a slight undercut and can therefore be well approximated by a shape that is implantable by way of a movement in the axial direction (also—and this applies generally to embodiments of the invention—a slightly undercut implant body shape is moreover possible, particularly as the thermoplastic material can fill cavities, which possibly arise by way of this and can therefore compensate dimensions). Secondly, feature C is based on the recognition that the anchoring by way of thermoplastic material is almost ideally compatible with a corresponding multi-canal root shape, by way of cavities or sub-cavities being able to lead into the various canals and thus ideally assisting a depth-effective anchoring. This can also be particularly advantageous since the bone tissue is generally more cancellous at a greater depth and includes more cavities, into which the liquefied thermoplastic material can flow, in order to form an anchoring after re-solidification.

If the implant is inserted directly into the extraction alveolus, then depending on the patient, the situation in which the bone tissue directly around the alveolus is very compact arises. This on the one hand has the advantage of a very large mechanical stability of the bone tissue which supports the implant. On the other hand, there is the possible disadvantage of comparatively little thermoplastic material being able to penetrate into the bone tissue and the related anchoring under certain circumstances would remain superficial. For this purpose, a method for the implantation of an implant of the claimed type described in this text, the method likewise belonging to the invention, envisages the bone tissue being removed only locally where the exit openings later lie. This can be accomplished by the experienced implantologist by hand with a suitable drilling tool or punching tool. Alternatively, adapted aids with a function that guides the user can also be used. For example, a non-rotating machining tool, which has an outer shape that is adapted to the extraction alveolus and, on account of this, can be introduced into this alveolus in an orientation that is defined with respect to this, can be used. Such a tool can be configured to remove bone tissue locally at the location of the exit openings, for example by way mechanical oscillations being coupled therein.

As a further alternative, the implant can be configured such that on implantation, it itself clears away the compacted bone tissue in a very local manner. According to feature D, this is effected with a cutting edge that is provided apically of the exit opening—and only there. In particular—but not only—with embodiments with feature D, one can envisage the exit opening or the exit openings lying in a region, in which the implant body has an apically pronouncedly tapering shape. By way of this, the cutting edge that lies apically of the exit opening only engages into the bone tissue when the implant body has already penetrated far into the alveolus, and the region, which is cleared of the compact bone tissue, is limited to the region in the direct proximity of the exit opening.

Such a cutting edge can run in an essentially horizontal manner, i.e. parallel to a plane that is perpendicular to the coronal-apical axis. It can also run obliquely, but not parallel to the coronal-apical axis. However, in contrast to approaches according to the state of the art, the cutting edge will not be peripheral, but restricted to the location of the exit opening, i.e. it is only as wide as the exit opening or insignificantly wider.

Such a cutting edge can also run in an essentially plough-like, i.e. V-shaped manner. In particular, it is suitable for grinding up the compacted bone tissue around the exit opening. Ground-up bone tissue (bone fragments, amongst these also fine grains) that arises due to this can also be cemented, i.e. shaped into a common solidified mass, by way of the exiting thermoplastic material.

Feature E utilises the fact that implants are already loadable to a certain degree directly after implantation. According to the first option, apart from the implant with the implant body and thermoplastic element, the implant system can also include a separate crown which can be placed onto the step, as well as optionally a gingiva former which can be applied before placing the crown. According to the second option, the crown can be present directly as one part with the implant, i.e. the implant as a whole forms an artificial tooth with a root and crown. Cement, which is envisaged for dental applications, can be used for example for closing the cavity or the cavities. The crown can be individually manufactured, according to both options According to a first option, the implant body itself can likewise be manufactured individually and this applies generally to implants according to the invention. This can be effected in a manner known per se by way of a computer-based method based of 3D-data (3D-printing). The 3D-data, which is used for the method, is based on measurement data that is taken from the patient, wherein this data is adapted manually or by way of software so that a cavity or a plurality of cavities with the characteristics described in this text is fitted in.

According to a second option, a plurality of implant bodies that are adapted to the natural tooth root shapes, and corresponding thermoplastic elements are provided, for example in different sizes. The implantologist then selects an implant in accordance with the implantation position. The invention also includes an implant set with a selection of premanufactured implants for different implantation situations. Such an implant set in particular can include implants with only one root canal as well as implants with several root canals, for example with two and with three root canals.

The thermoplastic material of the thermoplastic element can be resorbable, for example by way of it being composed on the basis of polylactide. The thermoplastic material then serves merely for the primary stabilisation, whereas the bone, which has grown into the structures of the lateral surface, then later assumes the stabilisation. The bone can then also grow into the exit openings, which yet further increases the mechanical stability. Alternatively, the thermoplastic element can also consist of a non-resorbable material, for example PMMA or a polyamide. There is a large selection of resorbable materials as well as non-resorbable materials that are suitable for the implantation, and the invention is not restricted to certain materials.

The implant body can be ceramic. The procedure according to the invention is particularly favourable for implant bodies of ceramic materials since it permits the available space to be utilised in an almost optimal manner and the wall thicknesses of the implant to be homogeneous, so that the breakage strength can be optimised.

However, the procedure according to the invention can be used just as well for implant bodies of metallic materials, for example materials based on titanium.

The cavity is generally cylindrical, i.e. is translationally symmetrical along the coronal-apical axis, as the case may be up to the branching into the sub-cavities. It is limited apically by an abutting portion, which, in particular, can include an energy director. Such an energy director can include a coronally projecting edge or tip.

Likewise the subject-matter of the invention is an implantation set, which, apart from the implant, also includes a sonotrode that is shaped to engage with its distal end from coronally into the cavity and to apply the mechanical oscillations as well as the pressing force.

Such a sonotrode can be coupled directly onto a device for producing the mechanical oscillations, or an intermediate part between such a device and the sonotrode can be used, for example for deflecting the oscillations. Such an intermediate part is disclosed for example in WO 2007/101 362.

If condition B is fulfilled, the sonotrode in particular can likewise include a non-rotationally-symmetrical distal end with a cross-sectional shape, which corresponds, for example, to the cross-sectional shape of the cavity.

A method for the patient-specific manufacture of an implant of the type described in this text is further the subject-matter of the invention. For manufacturing the implant body, in a first step, data of a patient is taken by way of measurement and is converted into a 3D model of an implant. This 3D model, as mentioned above, is subsequently adapted manually or by way of software such that a cavity or a plurality of cavities with the characteristics which are described in this text is incorporated. The dental implant body is then manufactured as a physical implementation of the 3D model, which is provided with the cavity, in a computer-assisted manufacturing method. Such manufacturing methods, which are based, for example, on a computer-controlled, targeted local excitation of the manufacturing mass for the purpose of solidification in the meanwhile are known and are not described further here.

Likewise the subject-matter of the invention is an implantation method.

BRIEF DESCRIPTION OF THE DRAWINGS

Embodiment examples of the invention are explained hereinafter by way of figures. In the figures, the same reference numerals indicate the same or analogous elements. There are shown in.

DETAILED DESCRIPTION OF THE INVENTION

Figure 1:
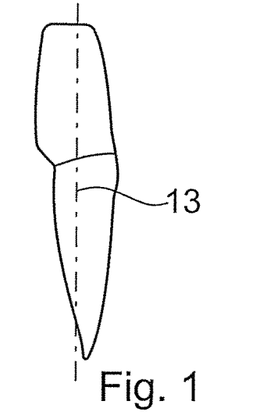
FIG. 1-5 illustrates different natural tooth shapes.
Figure 2:
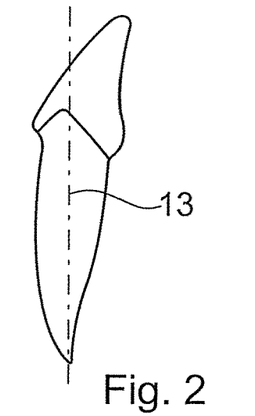
Figure 3:
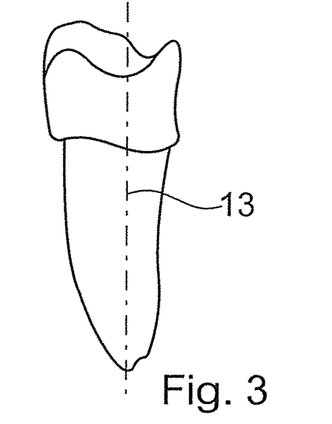
Figure 4:
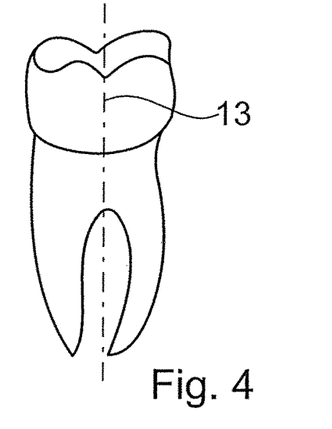
Figure 5:
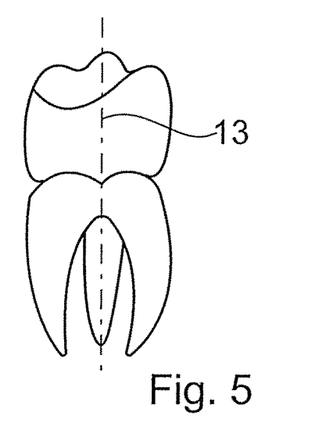

For illustration purposes, FIGS. 1-5 show a selection of natural tooth shapes, which are represented in a simplified manner. The tooth root can be roughly elliptical in cross section given the presence of a single root canal (FIG. 1, example of a lower incisor), approximately triangular (FIG. 2, example of a canine), approximately rectangular (FIG. 3, example of a second premolar) or also roughly circular or also relatively complex, and run in an apically tapering manner. FIGS. 4 and 5 illustrate teeth whose roots include two or three root canals.

One can see that in all cases the enossal region is not undercut or is only undercut to a small extent (given roots with two or more root canals) with respect to directions along the coronal-apical axis 13. The shapes can therefore be well approximated by way of non-undercut implant shapes, which can be inserted in the apical direction by way of a non-rotating movement.

Figure 6:
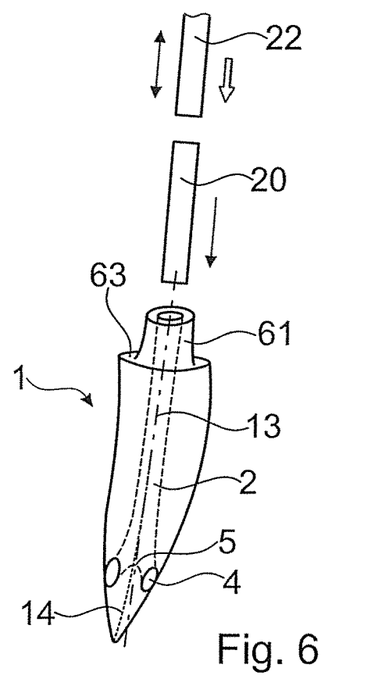
FIG. 6 shows an implant with a sonotrode.

FIG. 6 in a front elevation illustrates an implant with an implant body 1 and with a thermoplastic element 20.

The implant body 1 is manufactured for example of a zirconium oxide ceramic, in particular of an yttrium-stabilised ceramic based on zirconium oxide. Generally, the teaching, which is described here by way of embodiment examples, however also applies to implant bodies of another material, for example of another ceramic, in particular based on aluminium oxide, or of a metal, for example titanium or a titanium alloy. As already explained beforehand, the implant body can have been optionally manufactured in a patient-specific manner by way of suitable computer-assisted (CAD/CAM) methods (by way of 3D printing in the broadest sense). In such embodiments, the material selection can be adapted in accordance with the manufacturing method and for example be likewise selected on the basis of ceramics or metal, wherein the price, stability and metal sensitively can serve as criteria. Suitable materials are known per se, depending on the initial situation.

A cavity 2, which is open to the coronal end, extends over almost the entire length of the implant and is delimited apically by an abutting portion 5 extends apically from the coronal end in a manner roughly parallel to an axis 13. Two exit openings 4, which lie opposite one another, are formed radially outwards from the cavity 2 towards the outer surface (lateral surface). The abutting portion 5 is slightly pointed towards the middle so that its forms an energy director.

As one can see in FIG. 6, in contrast, the cross section of the implant body all in all is not constant in the enossal region, but the implant body has an apically steplessly tapering cross section. The outer surface (lateral surface) is for example roughened, e.g. by way of laser treatment or by way of sand blasting, or it is provided with a suitable layer, which likewise gives it a certain roughness. In particular, the outer surface is provided in order to promote osseointegration, and its roughness is adapted accordingly.

Furthermore, one can see that the outer shape optionally does not taper apically to all sides in the same manner, but in a non-uniform manner so that for example the apical tip does not lie on the axis 13. The centre of gravity of the horizontal section surface (i.e. of the surface in the section perpendicular to the axis 13) does not therefore run in a constant manner as a function of the axial position, but the respective centre of gravity line 14 is slightly arcuate. However, the outer surface of the enossal region of the implant body forms, for example, no undercut.

A post 61 for fastening a superstructure is formed in the coronal region. The cavity 2 extends axially through the post 61. In the drawn embodiment example, a step 63 forms between the apical region and the post 61. This step can be formed roughly at the level of the gingiva, and a projection, which is yet described hereinafter and is for the compression of the gums, can yet be optionally present. Differing from that which is drawn, another in particular continuous course can be present instead of a pronounced step 63, and respective shapes are known from dental implants of single-part systems or from abutments of two-part systems.

An opening 2, which is open to the coronal end, extends almost over the complete length of the implant and is delimited apically by abutting portion 5 extends apically from the coronal end in a manner parallel to the axis 13. Two exit openings 4, which lie opposite one another, are formed radially outwards from the opening 2 towards the outer surface (lateral surface). The abutting portion 5 is slightly pointed towards the middle, so that an energy director 7 whose function is yet explained hereinafter is formed.

A sonotrode 22 with a cross section that is adapted to the cavity 2 is moreover indicated. The cross section of the sonotrode 22 is such that this can be inserted into the cavity 2 essentially without any force effort when this cavity is free. The cavity 2 for example is cylindrical, i.e. at least in regions it has a cross section that is constant along the coronal-apical axis 13.

For the implantation, the implant is inserted into the extraction alveolus or cavity and for example is lightly hammered in, for example subsequently to the extraction of the natural tooth—possibly with an additional preparation step as is yet described hereinafter—or also subsequently to the preparation of a corresponding cavity in the jawbone.

The thermoplastic element is then pressed apically against the abutting portion 5 by way of the sonotrode 20 whilst this sonotrode is subjected to mechanical oscillations, by which means the thermoplastic material of the thermoplastic element 20 in contact with the abutting portion 5 is heated until it becomes flowable and is displaced outwards through the exit openings 4 and into the structures of the bone tissue on account of the pressing pressure. Here, the shape of the abutting portion, which acts as an energy director, can have the effect of the energy absorption initially primarily taking place in contact with this, by which means the thermoplastic material is heated there most of all. Since the internal friction of the thermoplastic material is much greater when this has a higher temperature (for example with amorphous thermoplastics when it lies above the glass transition temperature), the energy absorption also subsequently takes place predominantly at the apical end, by which means it is ensured that liquefaction takes place in the region of the exit openings 4. The interface between the sonotrode 22 and the thermoplastic elements 20 displaces continuously apically during this process, by which means the coronal regions of the cavity remain essentially free of thermoplastic material depending on the length of the thermoplastic element and after removal of the sonotrode can serve another purpose—for example for the fastening of an abutment between the implant body and the crown or a fastening part for a prosthesis—and/or can be closed by a suitable element.

Figure 7:
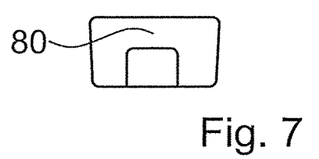
FIGS. 7 and 8 show a gingiva former and a crown for an implant according to FIG. 6.
Figure 8:
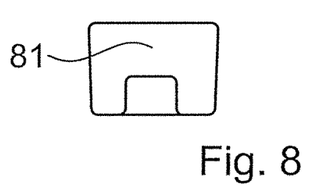

FIG. 7 in a very schematic manner illustrates a so-called gingiva former, i.e. a cap, which after implantation can be placed onto the post 61 until the gums have healed. A crown 81 (FIG. 8), which is adapted in accordance with the requirements, can be subsequently fastened to the implant body. Multi-part solutions with an abutment between the implant body and crown are also conceivable.

Figure 9:
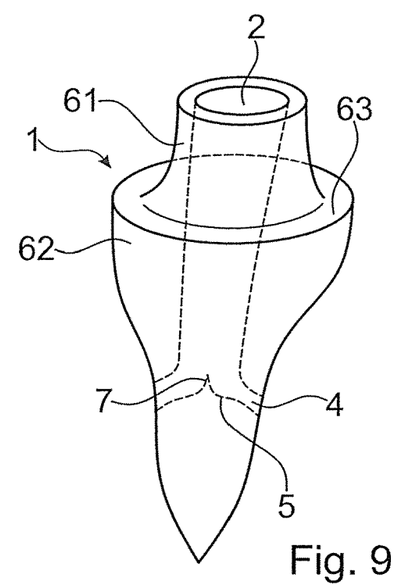
FIG. 9 shows an alternative implant body.

The embodiment according to FIG. 9 is firstly an example of an implant body, with regard to which, apart from the slightly elliptical outer shape of the implant body, the cross section of the cavity 2 is also adapted accordingly. The thickness of the wall, which is peripheral around the cavity 2, is therefore less inhomogeneous than if the cavity were to be rotationally cylindrical. Furthermore, the liquefaction and distribution of the thermoplastic material towards the sides where for anatomical reasons more space is present and a better anchoring is possible is simplified.

The embodiment according to FIG. 9 includes two optional features, which can be implemented independently of the cross-sectional shape of the cavity and independently of one another, i.e. also in embodiments other than those of FIG. 9:

The implant body 1 coronally forms a pronounced projection, which is arranged transgingivally in the implanted condition. In the region of the projection, the implant can optionally have a somewhat larger cross section than the extracted tooth. The gums are slightly compressed by way of this, which is already known per se from conventional implant systems.

The abutting portion 5 forms a pronounced, coronally pointing tip 7, which acts as an energy director and encourages the onset of the liquefaction of the apically pressed thermoplastic element when mechanical oscillations are coupled into this.

Figure 10:
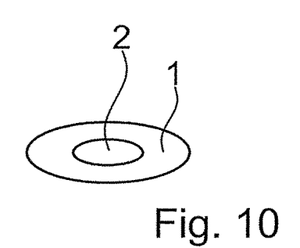
FIGS. 10 and 11 show different cross-sectional shapes.

FIG. 10 schematically illustrates a possible cross-sectional shape of the implant body 1, along a plane perpendicular to the apical-coronal axis and coronally of the exit openings 4 when the cross-sectional shape of the tooth to be replaced is roughly elliptical. The wall thickness can be kept roughly constant by way of the cross-sectional shape of the cavity 2, or it can be inhomogeneous, wherein the cavity is preferably accordingly directed to the outer cross-sectional shape, so that the wall thickness is at least less inhomogeneous in comparison to a corresponding rotationally cylindrical cavity.

Figure 11:
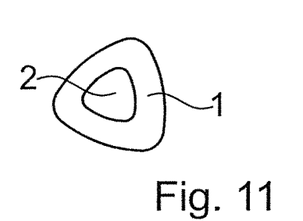

FIG. 11 illustrates the fact that an adapted cavity cross-sectional shape can also be selected in the case of non-elliptical, but for example approximately triangular cross-sectional shapes as in FIG. 11. The same also applies to other naturally occurring cross-sectional shapes, including approximately rectangular or waisted cross-sectional shapes.

Figure 12:
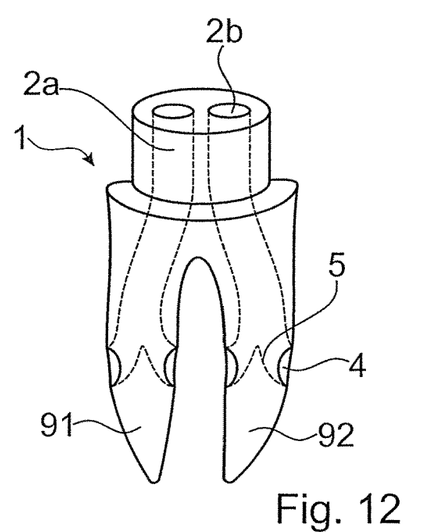
FIGS. 12 and 13 show, in each case, an example of an implant body with two root canals.

FIG. 12 shows a first example of an implant with a plurality of root canals 91, 92. A cavity 2a and 2b respectively is present per root canal. Accordingly, the implant includes two thermoplastic elements which are insertable into the cavities 2a, 2b or are already arranged in these, for example as a suitable filling. Each of the cavities leads into one of the root canals 91, 92. One or more exit openings 4 can be present per cavity/root canal.

Figure 13:
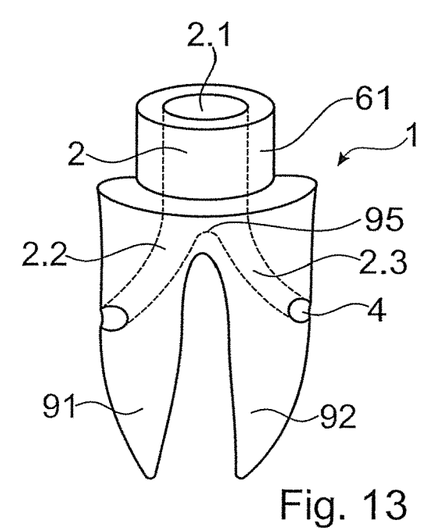

FIG. 13 likewise illustrates an implant with several root canals 91, 92. However, in contrast to the embodiment according to FIG. 12, only one cavity 2 is present, i.e. only a single respective opening is formed coronally in the implant body 1. The cavity includes a coronal region 2.1 which divides apically into sub-cavities 2.2, 2.3 for both root canals. One exit opening 4 or several exit openings can be present per sub-cavity. Since the thermoplastic element cannot be split up or bent without further ado in the solid condition, the liquefaction at least party will already take place at a depth, at which the coronal cavity region 2.1 merges into the sub-cavities 2.2, 2.3. For this purpose, an abutting and branching portion 95 can be shaped such that it is has energy-directing characteristics. The thermoplastic material in the essentially flowable condition is then pressed through the sub-cavities 2.2, 2.3.

Figure 14:
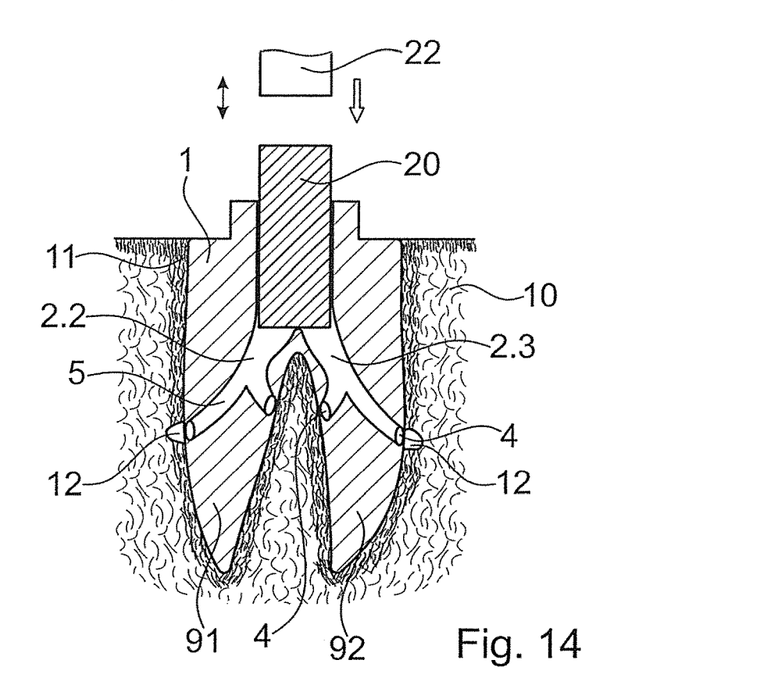
FIGS. 14 and 15 show sectioned representations of an implant during and after the implantation.
Figure 15:
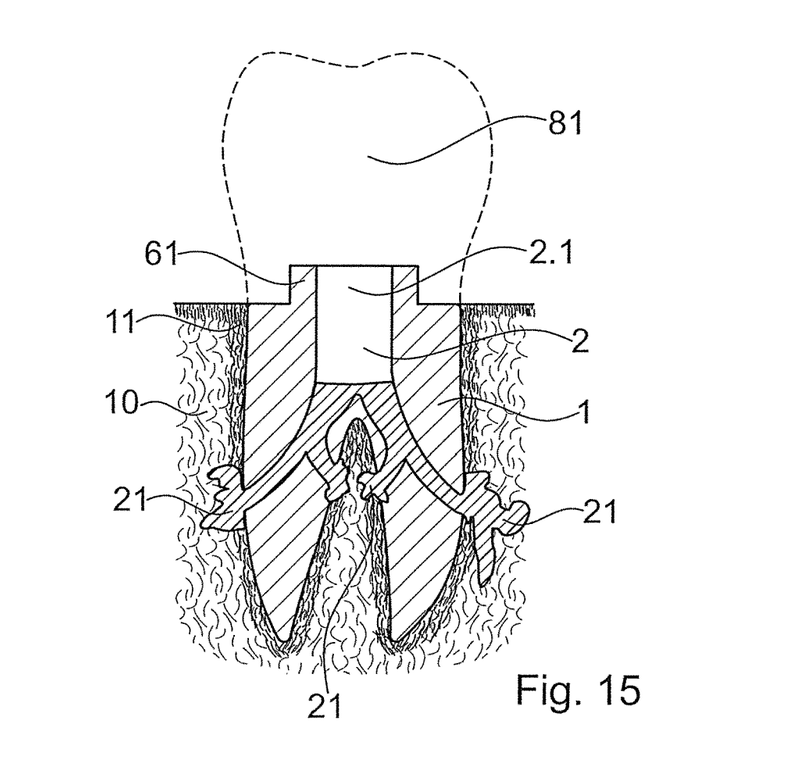

FIGS. 14 and 15 illustrate the respective method by way of implants, which are represented in a sectioned manner, with two root canals and with a cavity, which accordingly ends apically in two sub-cavities, wherein here two exit openings 4 per sub-cavity are illustrated, in contrast to FIG. 13. Some general principles of different embodiments of the method are also illustrated by way of the embodiment illustrated in FIGS. 14 and 15.

FIG. 14 shows the implant body 1 inserted into the extraction alveolus or possibly into an opening in the jawbone 10, the opening being prepared after the extraction, e.g. also long after the extraction. A compacted (cortical) share 11 of the bone, which is formed on the jawbone crest as well as around the extraction alveolus, is illustrated in FIG. 14. Prior to this, bone tissue has been removed or weakened in a targeted manner, in the region of the exit openings 4 or of at least some of the exit openings, so that an access 12 forms, through which access liquefied material can be brought into the cancellous bone behind the cortical layer.

In a first step, the implant body, optionally with an already introduced thermoplastic element is positioned relative to the bone and is introduced into the extraction alveolus or another matching bone opening. This step can optionally include a knocking into the bone. As is illustrated in FIG. 14 to some extent, a sonotrode 22 is subsequently used in order to press the thermoplastic element apically into the opening whilst it is subjected to mechanical oscillations, until this element starts to become flowable, firstly in contact with the abutting and branching portion 95, and gets through the sub-cavities 2.2, 2.3 to the exit openings 4 and is pressed through these into adjacent bone tissue. The sonotrode 22 is removed after the stoppage of the mechanical vibrations, possibly after a pressing pressure is still maintained for a certain time.

FIG. 15 shows the situation after the implantation procedure. Shares 21 of the thermoplastic material, which have penetrated into the bone, have re-solidified and therefore anchor the implant body 1 relative to the bone. Amongst other things, this anchoring effect is due to the thermoplastic material having interpenetrated structures (pores etc.) of the bone and having therefore created a positive fit. The fact that thermoplastic material has flowed behind cortical bone tissue 11 as is illustrated by way of the penetrated shares 21 at the very right in FIG. 15 can also contribute to this anchoring effect. A certain adhesion of the thermoplastic material to the bone tissue and/or to the implant body is also possible and can contribute to the anchoring.

A crown 81, which is subsequently placed on in a direct manner or indirectly via an abutment—possibly after a gum healing phase with an applied gingiva former—can be fastened to a post 61 and/or to the opening 2 and/or to the implant shoulder and/or to another structure of the implant body and possible also of the thermoplastic material.

Figure 16:
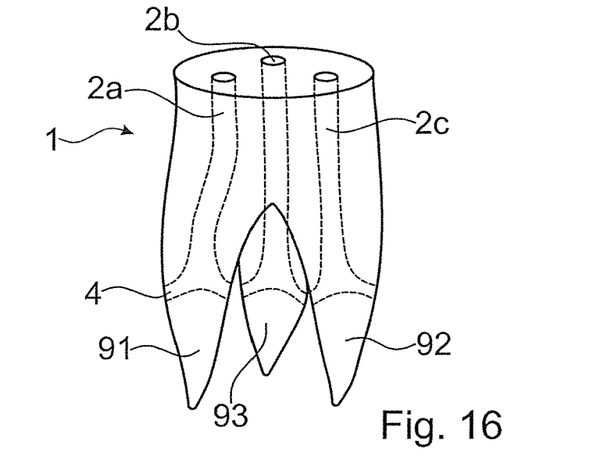
FIGS. 16-18 and 20 show views of implant bodies with three root canals.
Figure 17:
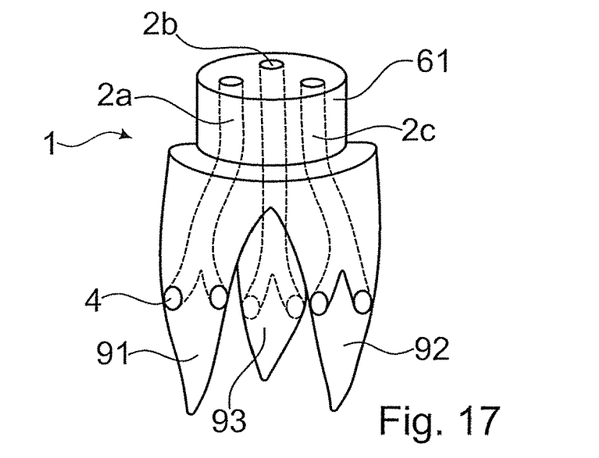

FIG. 16 shows an example of an implant body 1 with three root canals 91, 92, 93. A cavity 2a, 2b, 2c leads into each canal, i.e. the implant realises the principle which is described in FIG. 12 for an implant with two root canals. The implant according to FIG. 16 includes no post for fastening the crown. Instead, the crown can be fastened via fastening pins, which engage from coronally into the cavities 2a, 2b, 2c, and other principles, which are not illustrated in FIG. 16, are also conceivable. FIG. 17 shows a variant with an implant neck which serves as a post 61.

Figure 18:
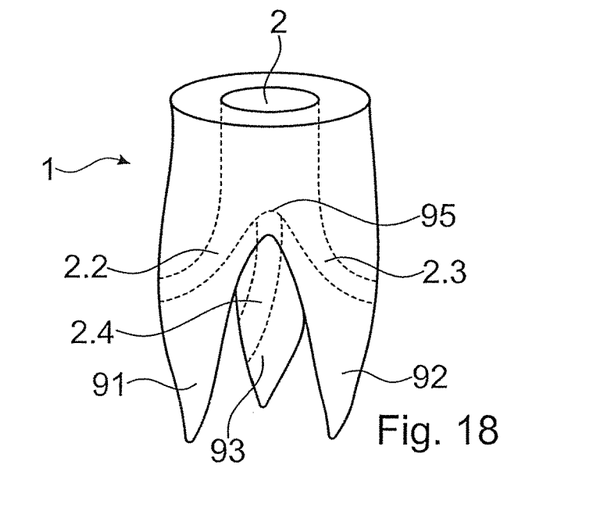
Figures 19, 20, 21, 22:
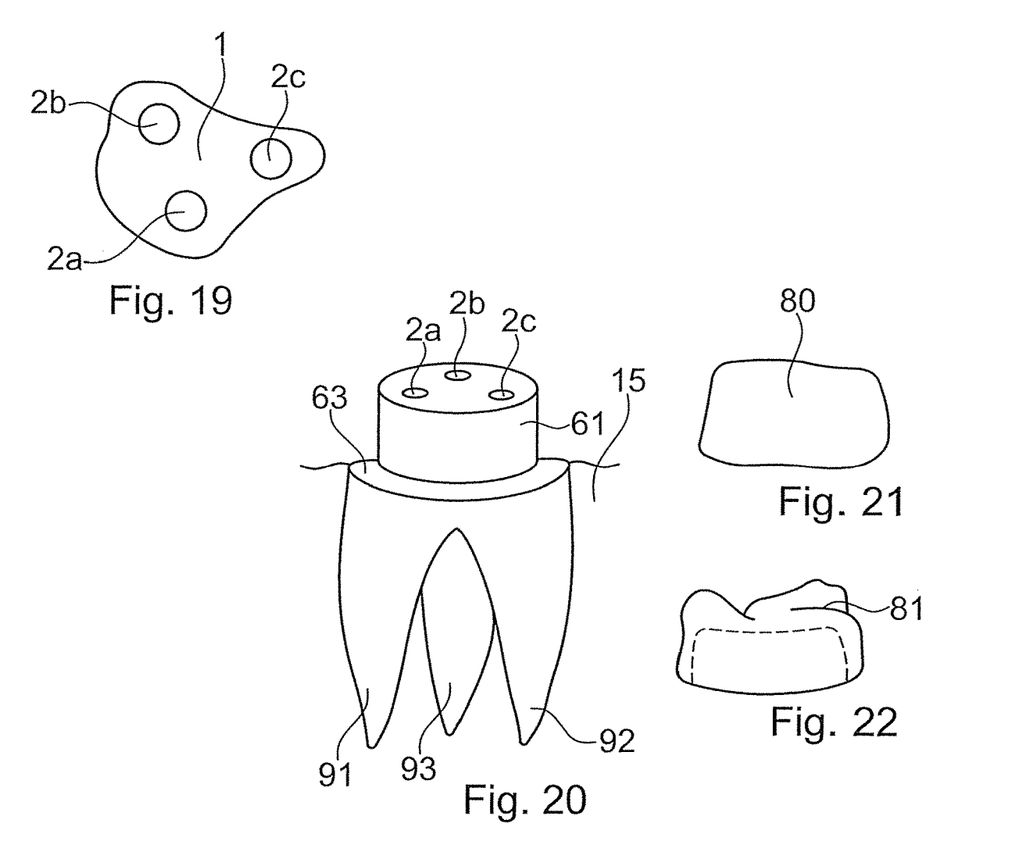
FIG. 19 show a cross-sectional shape.
FIGS. 21 and 22 show a gingival shaper and a crown for an implant according to FIG. 20.

FIG. 18—here by way of an example without a post as is the case in FIG. 16—shows the possibility the principle, which is described by way of FIG. 13, of only one cavity 2, which divides apically into two sub-cavities 2.2, 2.3. 2.4 for the root canals 91, 92, 93 being present, also being realised for an implant with three root canals FIG. 19, which schematically shows a horizontal section through the implant body 1, illustrates the principle of the distribution of the cavities being able to be adapted to the outer contour of the implant body, in embodiments according to FIGS. 12, 16 and 17 with several cavities 2a-2c.

FIGS. 20-22 by way of the example of an implant as is shown in FIG. 17 show the principle of a step 63 being able to lie between the apical region (which here includes an enossal region and a transgingival region) and a fastening post 61, roughly at the level of the gums, so that a possibly forming gap between a gingiva former 80 or a crown 81 and the apical region is roughly at this level. Other geometries are also possible. In particular, the implant can also be designed as a bone level implant, i.e. the respective step or the coronal end is then located roughly at the height of the jawbone crest.

Figure 23:
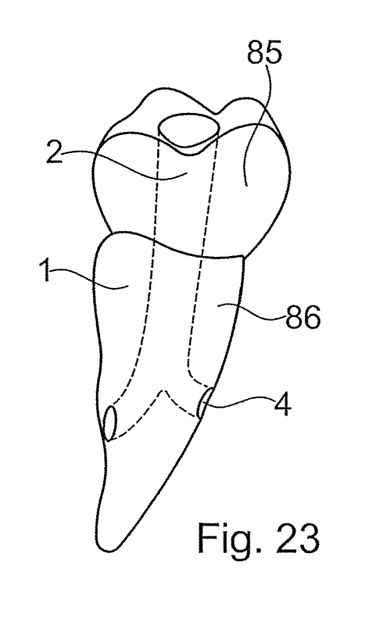
FIGS. 23 and 24 show a single-part implant with an integrally formed crown as well as a closure piece for this.
Figure 24:
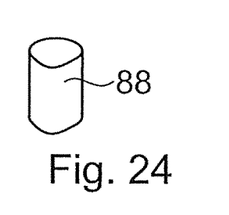

FIG. 23 by way of an implant with a single root canal shows the principle of a single-part implant body 1 which apart from the enossal region also forms the crown 85 and therefore functions as a replacement tooth. In this case, the coronal run-out of the cavity needs to be closed after implantation. This can be effected by way of a closure piece 88 as is drawn in FIG. 24. Such a closure piece can optionally already be present during the actual anchoring procedure and form an intermediate piece between the one sonotrode body and the thermoplastic element and therefore functionally belong to the sonotrode during the anchoring. It can also be introduced at a later stage, for example as cement, by way of which the run-out of the opening is filled, and which is subsequently cured. Neither does one rule out the thermoplastic material of the thermoplastic element forming such a closure.

Figure 25:
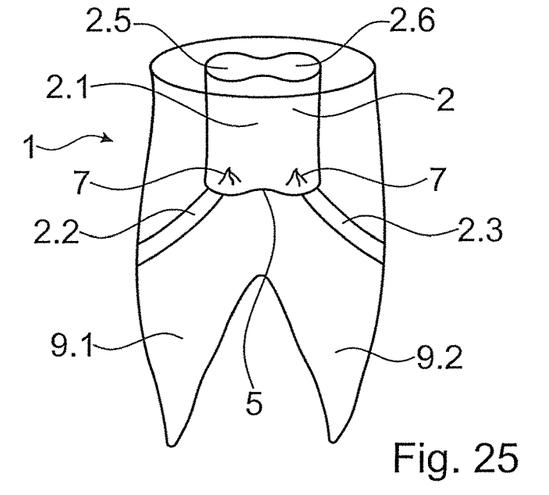
FIG. 25-28 show implants with several root canals and with a cavity with is multi-lobed in cross-section as well as corresponding thermoplastic elements.
Figure 26:
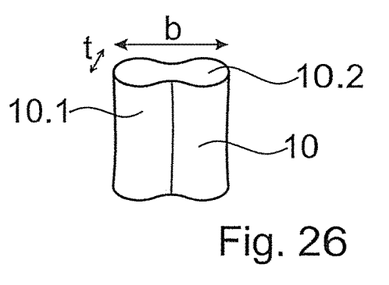

By way of an implant with two root canals, FIG. 25 illustrates the principle of the cavity being able to include a plurality of wings 2.5, 2.6, which lead to the sub-cavities 2.2, 2.3. Accordingly, the thermoplastic element 10 also includes a corresponding number (either two) of wings 10.1, 10.2. The ratio between the dimensions perpendicularly to the apical-coronal axis, width b and depth t can be adapted in accordance with the requirements and here can be for example approx. 2. An energy-directing tip structure or edge structure 7 can be present per wing 2.5 2.6, so that the liquefaction predominantly starts at the apical end of the wings and not necessarily in the middle between these.

Figure 27:
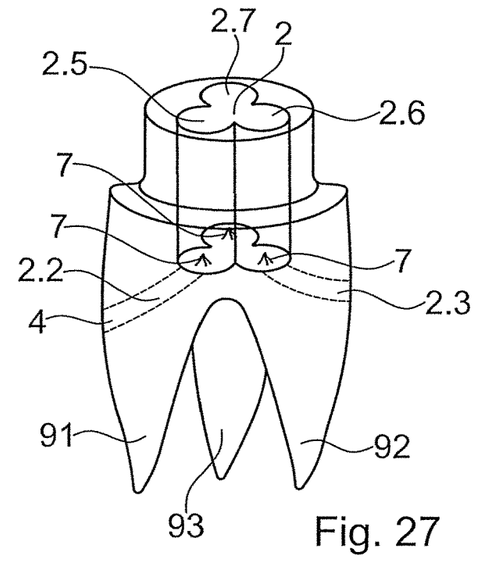
Figure 28:
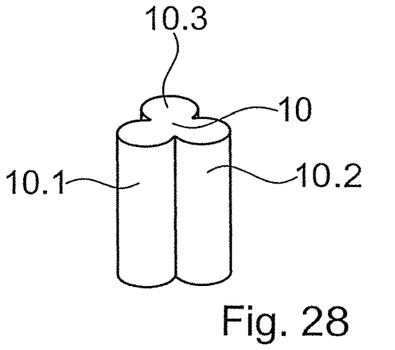
Figure 29:
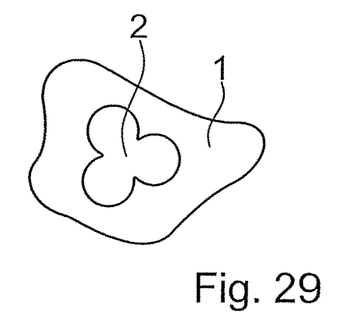
FIG. 29 shows a variant of a cross-sectional shape.

FIGS. 27 and 28 accordingly show an implant body and a thermoplastic element for an implant with three root canals 91, 92, 93, and FIG. 29 illustrates a corresponding cross-sectional representation, which shows that the orientation can be adapted roughly to the course of the lateral surface of the implant, also on account of anatomical conditions.

Generally and independently of whether wings of the illustrated type are present or not, in many embodiments an outer cross section of the thermoplastic element and/or of a distal end of the sonotrode is adapted to the inner cross section of the cavity—of the portion up to the abutting portion 5 or the abutting and branching portion 95.

Figure 30:
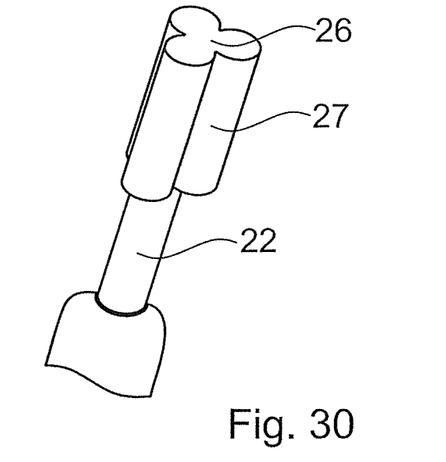
FIG. 30 shows an adapted sonotrode.

This is illustrated in FIG. 30 with the example of a sonotrode of this principle, the sonotrode being adapted to the embodiment of FIGS. 27-29. Due to the fact that the sonotrode 22 includes a distal end portion 27, which ends in a distal coupling-out surface 26 and which is adapted to the cross section of the cavity 2, a backflow of thermoplastic material in the coronal direction is also prevented when the thermoplastic element is liquefied up to the coronal (proximal) end.

As explained above by way of FIG. 14, it can be advantageous if the implantologist locally removes bone tissue or weakens it in a targeted manner, at the location of at least some of the exit openings, before the insertion of the implant body into the extraction alveolus. This can be effected by hand, possibly amid the use of suitable means, for example a mask which is matched to the implant.

Figure 31:
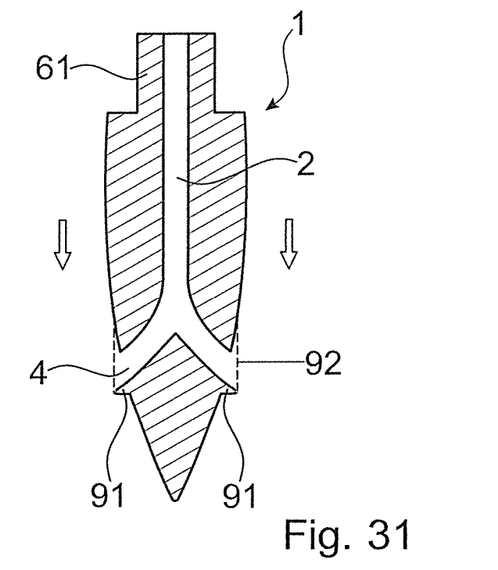
FIG. 31 shows an implant body with cutting edges.

FIG. 31 illustrates an alternative, according to which the implant body itself is equipped for the local removal of a part of the bone tissue at the location of the exit openings. For this purpose, firstly the exit openings 4 are arranged in a region, in which the implant body tapers apically. Secondly, a clearing element in the form of a projection, which forms a cutting edge 91, is located apically of at least one of the exit openings, for example apically of each exit opening. The cutting edges 91 at first have no effect on insertion of the implant body into the extraction alveolus due to the apically tapering shape. Only when the cutting edge get into the region, in which the extraction alveolus tapers into a cross section that corresponds to the cross section of the implant at the location of the exit openings 4 do the cutting edges engage into the bone tissue and locally clear away cortical bone tissue. The dashed lines 92 illustrate the possibility of the radial extension of the projections, which form the cutting edges 91 being able to be adapted to the radial extension of the implant towards the coronal end of the exit openings; generally the radial extension of the cutting edges will be somewhat larger.

Figure 32:
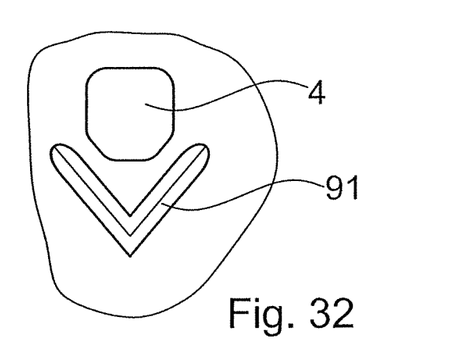
FIGS. 32 and 33 show alternative cutting edge shapes.
Figure 33:
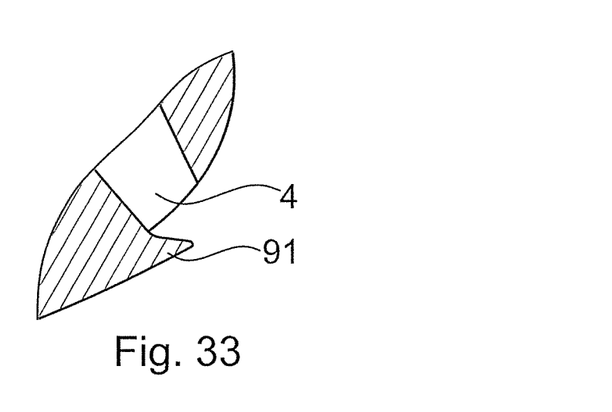

FIG. 32 in the form of a plan view of the region around the exit opening 4 shows a detail of an alternative implant body with a cutting edge 91. The cutting edge runs in a plough-like manner instead of horizontally, in order to permit a less brachial insertion of the implant. The cross section of the cutting edge 91 can also be adapted in accordance with the requirements, in order to penetrate into the bone tissue in a more or lesser aggressive manner. FIG. 33 shows a cross-sectional shape, which is significantly less aggressive in comparison to FIG. 31. In the drawn embodiment examples, the exit openings 4 are each arranged in particular only at one depth, there are not several levels with exit openings. This does not exclude the exit openings to different lateral sides being located at different heights (in particular slightly different heights) towards different lateral sides. A depth region, for example relatively far apically, can therefore serve for the primary stabilisation by way of the thermoplastic, whereas a stabilisation by way of osseointegration—in particular in direct contact between the implant and that bone tissue, which was already in contact with the extracted tooth before extraction—can begin immediately after the implantation in another depth region, for example somewhat further coronally.

For this purpose, concerning the embodiments with cutting edges, it can also be advantageous if no cutting edges are located coronally of the exit openings.

Figure 34:
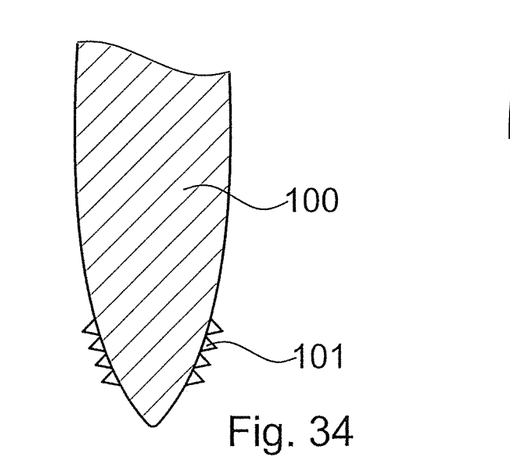
FIG. 34 shows a tool for preparing an extraction alveolus.

FIG. 34 illustrates a tool that, as such and in combination with other elements that are described in this text, likewise belongs to the subject matter of the invention, for preparing an extraction alveolus for implantation. The tool 100, at least in the region where this includes exit openings, has the shape of the implant body, which is to be subsequently implanted. Material-removing structures 101, for example in the form of a macroscopic roughness (grinding structures) or of small cutting edges or other prominences are present at the location of the exit openings. The tool 100 can be connected, for example, onto an apparatus for producing mechanical vibrations and can be introduced into the extraction alveolus. Here, it is subjected to the vibrations, by which means the tissue is locally removed and weakened in a targeted manner at the locations of the material-removing structures 101. The implant body is positioned subsequently to the removal of the tool 100 and the method is carried out as described above. The same appliance producing ultrasound can be used, for example, for subjecting the tool 100 to the mechanical oscillations and for coupling mechanical oscillations into the sonotrode. Independently of this, it is possible to operate at other, for example significantly lower frequencies for the preparation step than for the liquefaction step.

The invention claimed is:

1. A dental implant, comprising:
   an implant body which extends between a coronal and an apical end and which defines an enossal outer surface,
   wherein the implant body comprises a coronally open cavity as well as at least one exit opening from an inside to the enossal outer surface, and
   a thermoplastic element in the solid condition,
   said thermoplastic element being arranged in the cavity or being introducible into this,
   wherein the thermoplastic element can be brought into an at least partly flowable condition by way of applying a pressing force which is directed apically into the cavity and mechanical oscillations and in this condition at least a share of the flowable material of the thermoplastic element can be pressed through the at least one exit opening into surrounding bone tissue on account of the pressing force, when the implant body is arranged in an opening in the bone tissue and the enossal outer surface is in contact with the bone tissue, wherein in an enossal region, the implant body comprises several roots;

wherein the cavity or the cavities runs/run apically departing from the crown wherein the cavity has a non-rotationally symmetrical cross sectional shape, and the thermoplastic element has an outer cross sectional shape adapted to the non-rotationally symmetrical cross sectional shape of the cavity; and wherein the cross sectional shape of the cavity is multi-lobed, with one lobe present for each root.

2. The dental implant according to claim 1, wherein the cross-sectional shape of the cavity is matched to an outer cross-sectional shape of the implant body.

3. The dental implant according to claim 1, wherein the cavity is a single cavity leading apically from a coronal end surface of the implant body and branching apically into sub-cavities, the sub-cavities connecting to different ones of the lobes and each leading into one of the roots.

4. The dental implant according to claim 3, wherein a plurality of the exit openings is present per sub-cavity.

5. The dental implant according to claim 1, wherein the thermoplastic material is resorbable.

6. The dental implant according to claim 1, wherein the thermoplastic material is not resorbable.

7. The dental implant according to claim 1, wherein the implant body is manufactured of a ceramic material.

8. The dental implant according to claim 1, wherein the implant body is manufactured of a metal material.

9. The dental implant according to claim 1, which is individually manufactured in a patient-specific manner.

10. The dental implant according to claim 1, which is manufactured as an implant from a series of identical implants.

11. An implantation set, comprising a dental implant according to claim 1, as well as comprising a sonotrode that is shaped to engage from coronally into the cavity and to apply the mechanical oscillations as well as the pressing force.

12. A method for manufacturing a dental implant body for a dental implant according to claim 1, wherein, in a first step, data of a patient is taken by way of measurement and is converted into a 3D model of an implant, wherein this 3D model is provided with the at least one cavity and the dental implant body is subsequently manufactured as a physical implementation of the 3D model which is provided with the cavity, in a computer-assisted manufacturing method.

13. A method for implanting a dental implant according to claim 1, wherein subsequently to an extraction of naturally grown dental tissue or an implant, firstly compact bone tissue is removed locally at an anchoring location and the implant body is subsequently positioned such that the exit opening runs out towards the anchoring location, whereupon thermoplastic material of the thermoplastic element is brought into the flowable condition by way of the oscillations and the pressing force and is pressed through the exit opening into the bone tissue at the anchoring location, whereupon the oscillations are stopped, wherefore the thermoplastic material re-solidifies and thus anchors the implant body at the anchoring location.

14. The dental implant according to claim 1, wherein in an enossal sub-region, an outer surface of the implant body comprises a non-round cross section which reduces apically in a continuous and stepless manner.

15. The dental implant according to claim 14, wherein the enossal sub-region corresponds to a complete enossal region of the implant.

16. The dental implant according to claim 1, wherein a cutting edge is present apically of each exit opening.

17. The dental implant according to claim 16, wherein the cutting edge runs essentially horizontally but does not run completely peripherally in the peripheral direction.

18. The dental implant according to claim 1, wherein, as a constituent of a multi-part implant system, the implant forms a step at the gingiva level or the implant forms a single-part implant system with a crown, wherein the cavity or the cavities runs/run apically departing from the crown.

19. The dental implant according to claim 18, wherein a coronal run-out of the cavity is formed in a central region coronally of the step.

* * * * *